(12) United States Patent
Arcaini et al.

(10) Patent No.: US 10,523,858 B1
(45) Date of Patent: Dec. 31, 2019

(54) APPARATUS AND METHOD TO CAPTURE CONTINUOUS HIGH RESOLUTION IMAGES OF A MOVING TRAIN UNDERCARRIAGE

(71) Applicants: Gianni Arcaini, Jacksonville, FL (US); William Scott Carns, Jacksonville, FL (US); Charles Hoeppner, Jacksonville, FL (US); Israel Umbehant, Jacksonville, FL (US)

(72) Inventors: Gianni Arcaini, Jacksonville, FL (US); William Scott Carns, Jacksonville, FL (US); Charles Hoeppner, Jacksonville, FL (US); Israel Umbehant, Jacksonville, FL (US)

( * ) Notice: Subject to any disclaimer, the term of this patent is extended or adjusted under 35 U.S.C. 154(b) by 0 days.

(21) Appl. No.: 16/156,150

(22) Filed: Oct. 10, 2018

(51) Int. Cl.
*H04N 5/232* (2006.01)
*H04N 5/225* (2006.01)
*G03B 11/00* (2006.01)
*G01P 1/02* (2006.01)
*G02B 1/11* (2015.01)
*B61L 25/02* (2006.01)
*G01P 3/50* (2006.01)
*G03B 17/17* (2006.01)

(52) U.S. Cl.
CPC ........ *H04N 5/23203* (2013.01); *B61L 25/021* (2013.01); *G01P 1/026* (2013.01); *G01P 3/50* (2013.01); *G02B 1/11* (2013.01); *G03B 11/00* (2013.01); *G03B 17/17* (2013.01); *H04N 5/2252* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 3,721,821 A | 3/1973 | Blanyer | |
| 6,856,344 B2* | 2/2005 | Franz | G01N 21/8806 348/143 |
| 7,481,400 B2 | 1/2009 | Appleby et al. | |
| 8,892,368 B2 | 11/2014 | Saracho Rotaeche et al. | |
| 2004/0239268 A1* | 12/2004 | Grubba | A63H 19/24 318/268 |
| 2012/0268626 A1* | 10/2012 | Lu | H04N 5/2256 348/241 |
| 2012/0274838 A1* | 11/2012 | Teggatz | H04N 5/2256 348/371 |

* cited by examiner

*Primary Examiner* — Eileen M Adams
(74) *Attorney, Agent, or Firm* — Lawrence J. Gibney (57) ABSTRACT

A container that will house components of the device will be mounted to railroad ties to permit the user of this device to gather high resolution images of the undercarriage of a moving train car as it passes over a container that houses certain components of the system. The speed of the camera shutter will be dictated by the software that will work in conjunction with a linear speed detection device. The gathered images can be reassembled and forwarded to a remote location. The software provides an alarm in the event of a present danger.

13 Claims, 8 Drawing Sheets

APPARATUS AND METHOD TO CAPTURE CONTINUOUS HIGH RESOLUTION IMAGES OF A MOVING TRAIN UNDERCARRIAGE

PRIORITY CLAIM

This is a continuation in part of a prior filed application and the applicants seek priority based on that prior Application with the Ser. No. 14/971,145 with a filing date of Dec. 16, 2015.

RELATED APPLICATIONS

This application is related to the application, Method and Apparatus for the Accurate Linear Speed Measurement for Trains with Ser. No. 14/994,264 with a filing date of Jan. 13, 2016 and has been filed by the same inventors.

FIELD OF THE INVENTION

This application relates to railroad inspection and specifically the inspection of the undercarriage of a moving train. It will be comprised of two separate devices that will work together to first detect the speed of a train and secondly a device that will enable images to be taken of the undercarriage of the train and send the information to a remote location.

It is critical at times to be able to visually inspect and communicate the inspection of the integrity of a train, particularly its undercarriage. Ideally this inspection should be done while the train is moving to avoid the interruption of the train service and lessen the impact on any population centers. It would also be helpful to communicate that data to a remote locations.

In order to enable the device to capture high resolution images a plurality of speed detection devices will be placed on the railroad tracks for a predetermined length that will allow the user of this device to calculate the speed of a train within a fraction of a mile per hour. As a train passes over each one of the markers or indicators a measurement is taken and corresponding speed of the train is calculated using an algorithm for that purpose.

When the speed of the train is calculated, software is incorporated to interact with a device to take high-speed resolution images of the undercarriage of a train. This is accomplished by adjusting the frame rate of the camera that is involved as well as adjusting the illumination means.

The second component of this device is placed on the railroad ties between the railroad tracks; it is most likely buried to prevent injury to the components. As a train moves along the railroad tracks, the device will capture high resolution images of the undercarriage of the moving train. The images can then be transferred to remote locations to detect the presence of anomalies that would then result in appropriate remedial action.

PRIOR ART

Currently, in order to inspect the undercarriage of a train the train must be stopped and visually inspected by personnel.

This invention is intended to replace the procedure of slowing or stopping a train while a team of security personnel physically searches and inspects for potential hazards on the train undercarriage. The process of stopping a train costs significantly more time and resources than the presented invention. This invention records a series of digital images that are transmitted to a remote location for viewing by an individual or a computer.

There are other prior art references that teach the undercarriage inspection systems. Specifically, a representative example is U.S. Pat. No. 6,856,344 by Franz is an image inspection system of vehicle undercarriages of cars. Although this invention may be useful for monitoring vehicles, it does not teach a use for inspecting train undercarriages, which present unique problems.

There are many prior devices that are utilized to provide the speed of trains. However, few can calculate the linear speed of a train with the necessary precision and accuracy of the present invention. The precision that is required allows the frame speed of the camera to be adjusted to obtain clear images.

The U.S. Pat. No. 8,892,368, by Saracho Rotaeche et al. (Saracho), discloses a method for attaching sensors to railway tracks. The sensors in this device measure stresses in track railways. This is done by analyzing the movement of vibrations through the rail car. The sensors are also capable of measuring speed by recording the times of different signal peaks recorded by the system. The present invention on the other hand utilizes the actual wheels of a rail car for determining the speed of the train.

While U.S. Pat. No. 7,481,400, by Appleby et al. (Appleby), and U.S. Pat. No. 3,721,821, by Blanyer, also disclose devices that utilize railway wheel sensors to determine train speed, the present invention discloses differences that are unique and non-obvious from the prior art. Appleby measures vibrations to determine when the wheel of the train is present and Blanyer uses magnetic fields to complete a circuit as the train wheel passes through them.

The present invention is novel and significantly different from the prior art in that it incorporates a plurality of devices containing within each a plurality of sensors that work in tandem to determine very precise and accurate measurements of the speed of a train at a given point in time.

BRIEF DESCRIPTION OF THE INVENTION

On the undercarriage of a train it is important to be able to detect any anomalies such as foreign objects that may be lodged in the undercarriage as well as check the integrity of the hasps, knuckles, bolt plate, bolts and sill on the undercarriage of the train. A defect in the hasp, knuckle or bolt plate may cause the train to derail. Similarly, a foreign object on the undercarriage should be detected as soon as possible so that remedial action can be taken, if needed.

One part of the application is a container that houses several individual components including the following: camera, mirror, lighting, anti-glare glass and a slit through which the images are taken. The components of the device are placed in a container that is secured between the railroad ties. The placement of the container that houses the components is designed to prevent harm to the components. It may be mounted to the railroad ties or buried depending on the desires of the customer.

The second component measure the speed of a moving train by utilizing a plurality of bars with each containing a series of sensors that are evenly spaced along the bar to measure the speed of the train. Each sensor detects the presence of the train wheel and through this plurality of sensors calculates the speed of the train with exact precision.

The speed of the train is then communicated with a computer control module every time the train's wheel passes over each sensor.

Each of the sensors is angled so that the wheel of the train will come within 25 millimeters of the sensor.

Although it is anticipated that there are many bars that may be used and many sensors that may be placed on each device, the preferred embodiment is to have a series of five sensors on each bar and four bars placed along the rail of a track for a total of twenty sensors on each side of the tracks. This will provide the computer control module with enough values to calculate the speed of the train and allow the camera to operate and take detailed synchronized photos of the moving train. If an inaccurate speed of the train is calculated, it will affect the speed of the camera frame and consequently, produce less than desirable images of the undercarriage of the train.

It is anticipated that the speed of the train can be calculated within a fraction of a mile per hour with this system. This accuracy is necessary to ensure that the frame speed of the camera in the application works appropriately and produces the best quality image.

Images from a high speed camera that is located in the container beneath the undercarriage of the train will take a multitude of pictures that are transmitted to a separate server. Because trains are moving at relatively rapid speeds, it is important to initially accurately measure the speed of the train in order to establish the rate at which the camera should takes photos of the train's undercarriage.

The system is "activated" as the train passes over a certain point on the track relative to the container that houses the components of the system. Although a variety of means may be used it is likely to be through use of a laser system that is mounted in close proximity to the railroad tracks and the components of the system.

As the train rolls on the tracks, it will roll over a Slit in the buried container, which is approximately three pixels wide. Images will be continuously taken of the train's undercarriage at very high speeds using the camera that has been installed in the container for that purpose. The speed at which images are taken directly correlates with the speed of the train which is provided by the linear speed measurement device.

The camera is positioned so that the image is taken by deflecting the image off a mirror. This helps to ensure that a proper image resolution and quality can be achieved while also preventing damage to the internal components of the device.

As the images are collected, the series of photographs are collected in fragmented pieces and then reassembled in the image of a preset image, likely an individual train car. Each of the collections of "train cars" are then reassembled into a complete train.

In order to ensure that the quality of the picture is not affected, a means of lighting is also provided. The means of lighting can be controlled both in terms of the intensity of the light as well as the direction of the light to obtain the best possible image of the undercarriage.

Anti-glare glass is also provided above the slit through which the image is taken to maximize the quality of the image. Trains operate in a multitude of operating conditions and the camera and all associated equipment must be able to operate in a multitude of lighting scenarios. Although no specific type of camera is contemplated, various types of cameras would include infrared cameras.

Software is included that will initially set the speed of the camera and operate the camera, using the associated linear speed detection device. The software will also permit the image to be reassembled and then transmitted to a remote location.

The software will also control the lighting around the area so that the best possible image may be taken to prevent shadows, among other environmental factors.

NUMBERING REFERENCE

1 Railroad tracks
2 Railroad ties
5 Container
10 Camera
15 Mirror
20 Means of lighting
25 Anti-glare glass
30 Slit
35 Controller for container components
40 Software
45 Image transfer
75 Magnets
80 Sensor
85 Speed Sensor Casing
90 Speed Sensor Stabilizer
95 Cover
100 Screws to Attach Cover
110 Speed Sensor Device
115 Controller for the speed sensor device

DETAILED DESCRIPTION OF THE EMBODIMENTS

The modern train moves along a set of parallel railroad tracks 1 with a locomotive and a series of cars attached to the locomotive. Beneath the tracks 1 are a plurality of the railroad ties 2 that rest perpendicular to the railroad tracks and support the railroad tracks. This system of train travel has existed from the beginning of train travel. Because trains are typically loud and tend to travel throughout the night, trains often move in very remote locations.

Because trains are also large cumbersome structures it is important to be able to periodically inspect the connections between cars as well as the general condition of the undercarriage of the train. The train cars are typically assembled using a set of knuckles and hasps that connect the cars. With this type of system the cars can be disconnected if desired. It is imperative that the integrity of the connections means (knuckles and hasps) and the train's undercarriage be inspected periodically. The failure of the connection means may lead to the derailment of a train with its attendant costs.

In the prior art the train would need to be stopped in order to allow humans to visually inspect the undercarriage for defects. This is cumbersome and results in delays in train travel and moving goods and people from location to location.

This system incorporates a series of components that will allow the undercarriage of a train to be inspected periodically without the need to stop the train for a visual inspection. One of the parts of this application measures the speed of the train while the other operates a camera to take detailed pictures of the undercarriage of the train.

A container 5 with some of the components of this device is placed between to the ties 2 of a railroad track 1 and is designed to be portable; the container 5 may also be buried to prevent injury to the individual components that are contained within the container 5. The train will move on the railroad tracks 1, which are perpendicular to the ties 2. As the train cars move over the container 5 a series of high resolution photographs are taken of the train's undercarriage.

The system is turned "on" using a predetermined activation means (not depicted) in the software that will detect the presence of a train. The system will remain active as long as it is required to capture the images and the system will automatically turn the system "off" using a preset in the software 40 for that purpose. During the normal operation of this device the components of the system are not operational until the presence of a train is detected by the activation means. There are many different types of activation means, such as the use of a laser, but no particular activation means is being claimed in this application.

Figure 8:
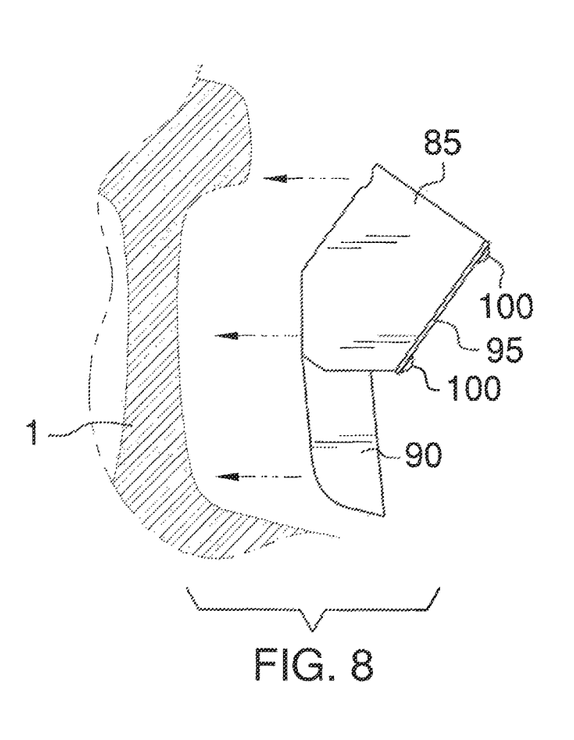
FIG. 8 is a detailed view of the sensor attached to the rail.
Figure 9:
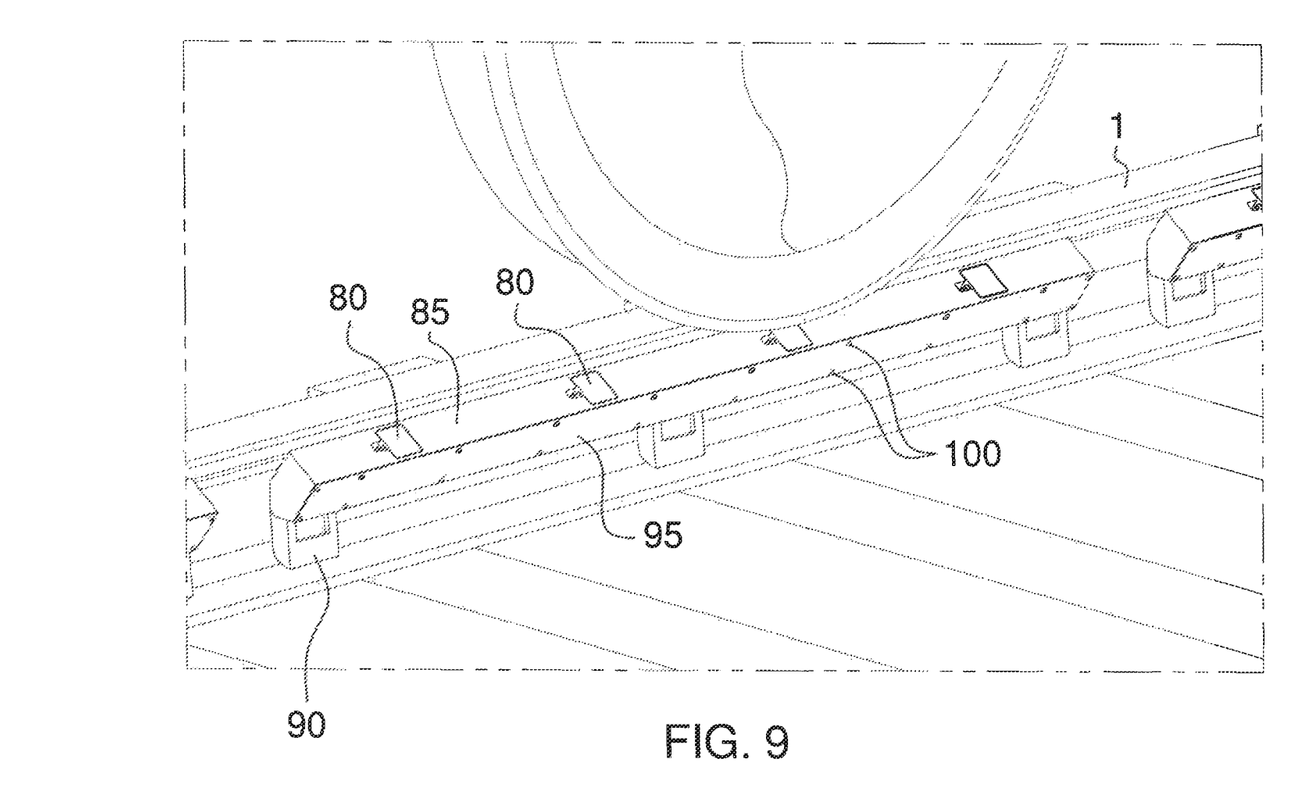
FIG. 9 is an in-use view of the linear speed detection device.
Figure 10:
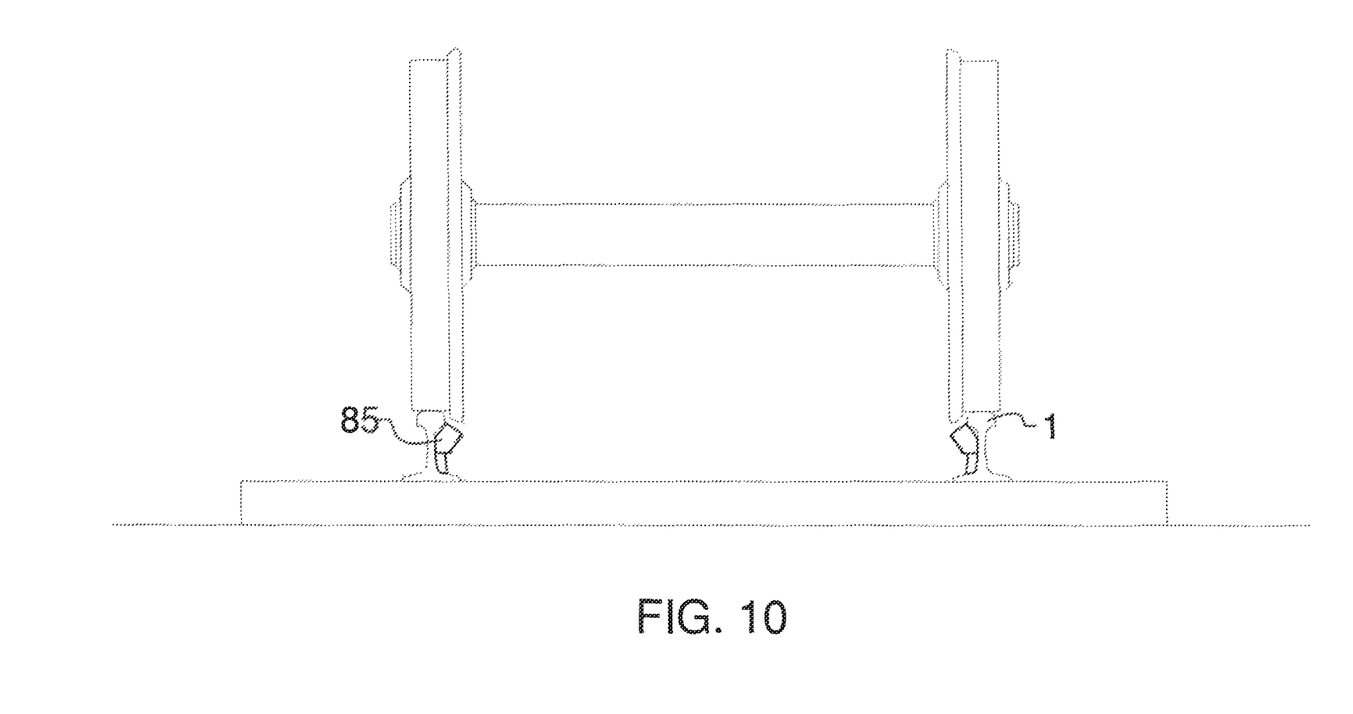
FIG. 10 is a front view of the linear speed detection device attached to the rail and a depiction of the train wheel.
Figure 11:
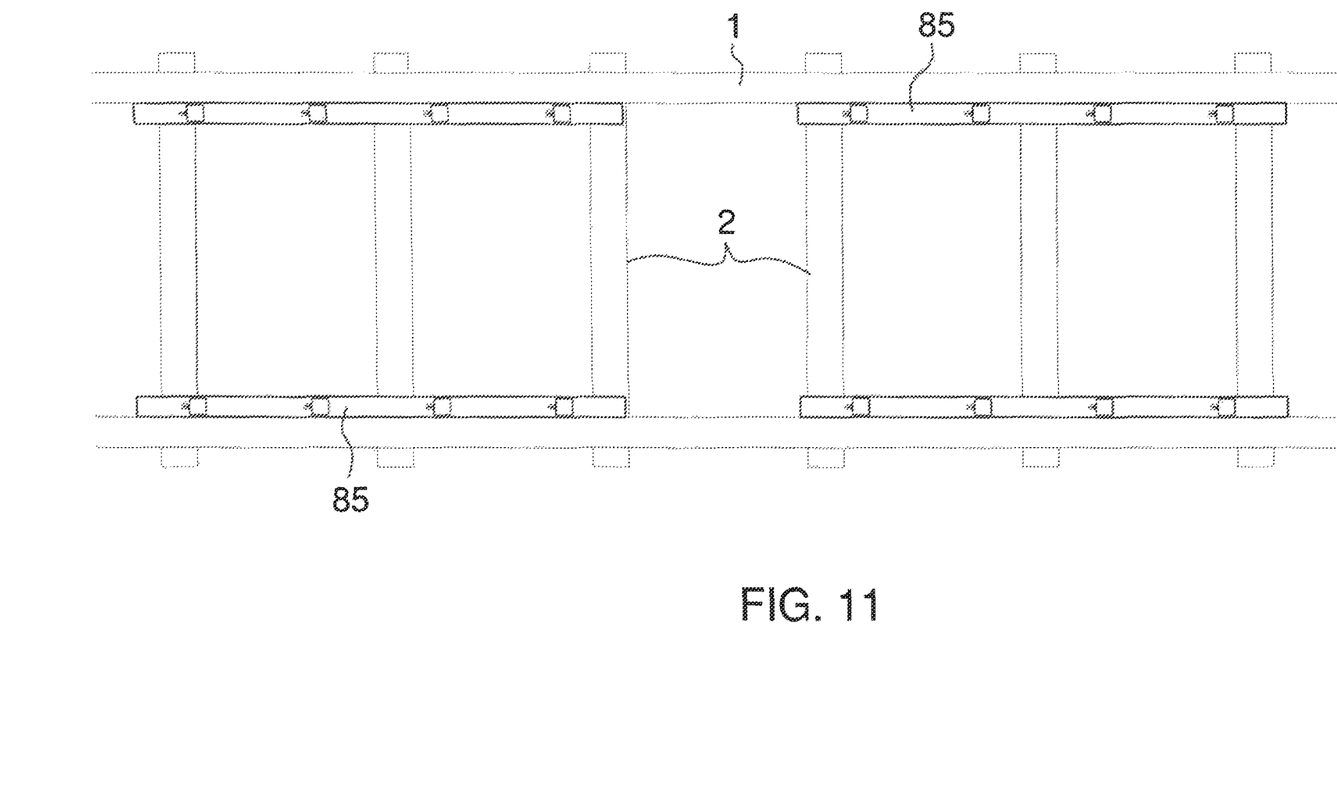
FIG. 11 is a top view of the linear speed detection device installed on the tracks.
Figure 12:
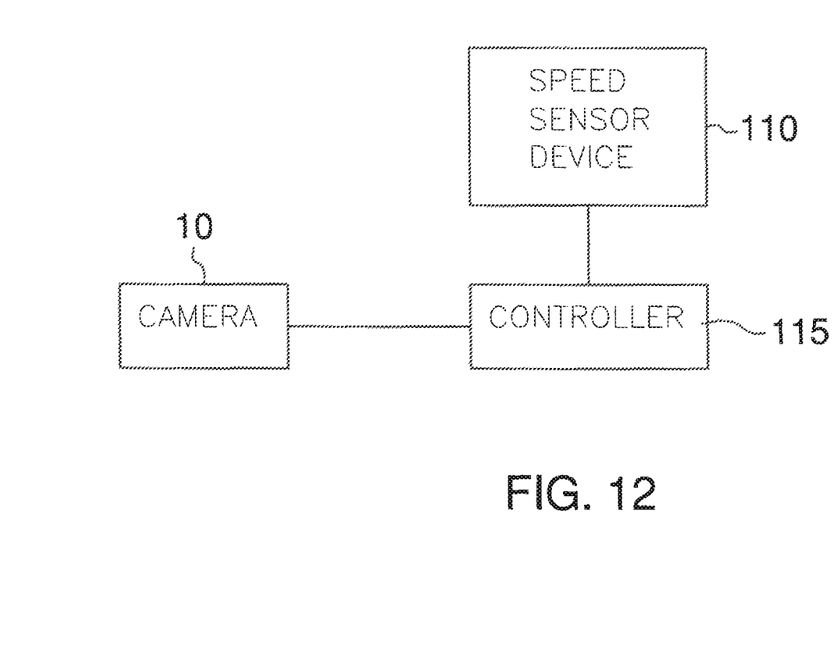
FIG. 12 is a schematic of the components of the linear speed detection device.

A plurality of inductive sensors 80 are placed at predetermined locations on a railroad track 1. The sensors are placed a foot apart and are encased in a protective casing 85 and a cover 95 with a means to open 100 the sensor such as a screw. The plurality of sensors are attached to a bar that is used for that purpose. Additionally the shape of the sensor should also be designed so that the sensor is attached to the track in order to most closely conform to the shape of the track such as depicted in FIG. 8; for that purpose a speed sensor stabilizer 90 that conforms roughly to the surface of the railroad track is used for additional stability.

The plurality of sensors are attached to the railroad tracks 1 using a plurality of magnets 75. The sensor is positioned so that when the railroad wheel passes over the inductive sensor, the sensor 80 will detect the presence of the wheel and activate the system.

Measurements from the plurality of sensors will enable the calculation of the speed of the train within a fraction of a mile per hour. The exactness of the speed of the moving train is critical because this speed calculation controls the speed of the camera in this application. It is imperative that the speed be accurately calculated so that the speed of the camera can be appropriately controlled and quality images can be produced.

The placement of the individual sensor in relation to the train wheel should be no more than 25 millimeters from the surface of the train wheel in order to ensure that the sensor detects the presence of the train wheel.

As each train wheel passes over the sensor 80 the data from the speed sensor device 110 will then be transmitted to a controller for the linear speed detection device or speed sensor device 115 so that an accurate measurement of the speed of the train can be calculated. A plurality of sensors 80, which are equally spaced on the bar 95 to insure the uniform spacing of the sensors, is used in order to be able to calculate the speed within a fraction of a mile per hour. The speed of the train which is calculated using associated software and a controller for the speed sensor device 115 to transmit the information to the camera 10 determines the frame speed of the camera.

Although a plurality of sensors are used and placed on the bar, an individual sensor can be replaced or serviced if needed. It is anticipated that there will be four or five sensors on the bar and each sensor will be placed roughly one foot apart in order to calculate the exact speed of the train and therefore produce the best quality images.

Figure 1:
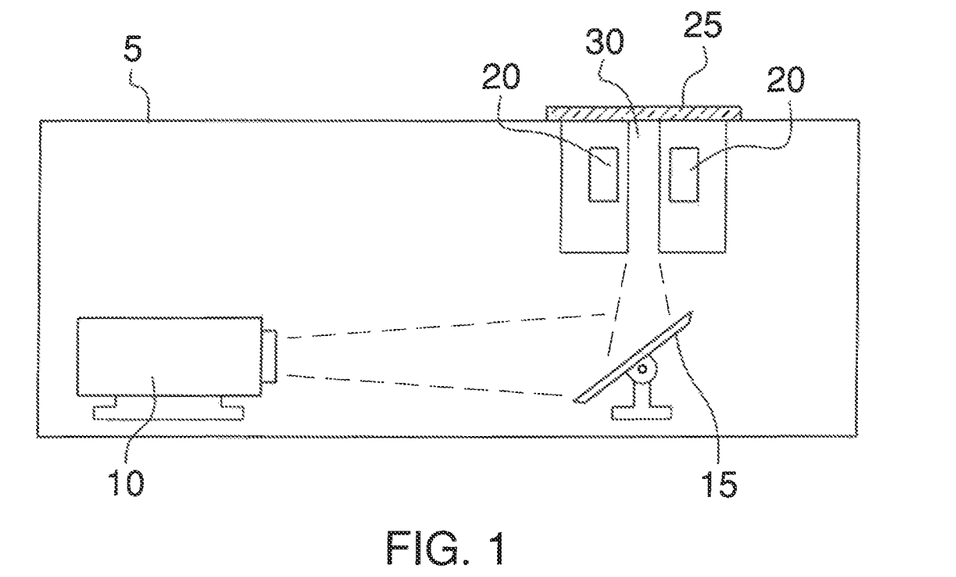
FIG. 1 is a view of the components of this device within the container.
Figure 2:
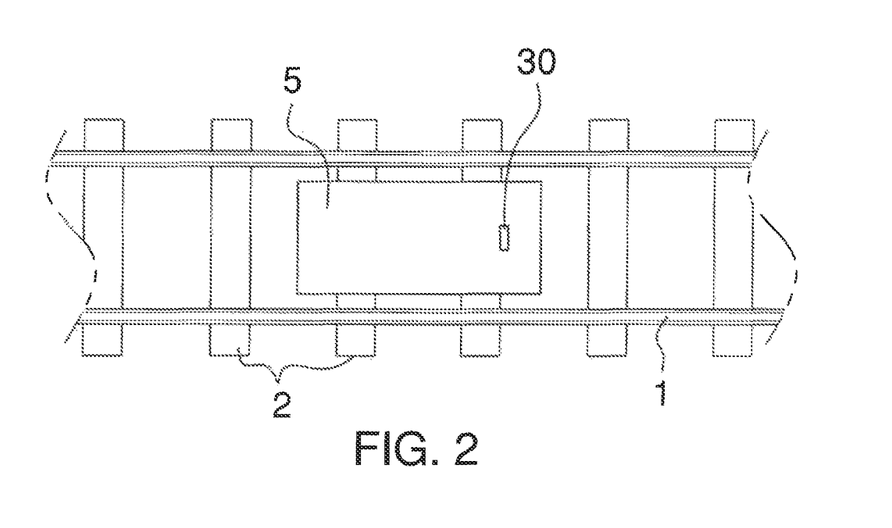
FIG. 2 is a representation of the container mounted on the railroad ties.
Figure 3:
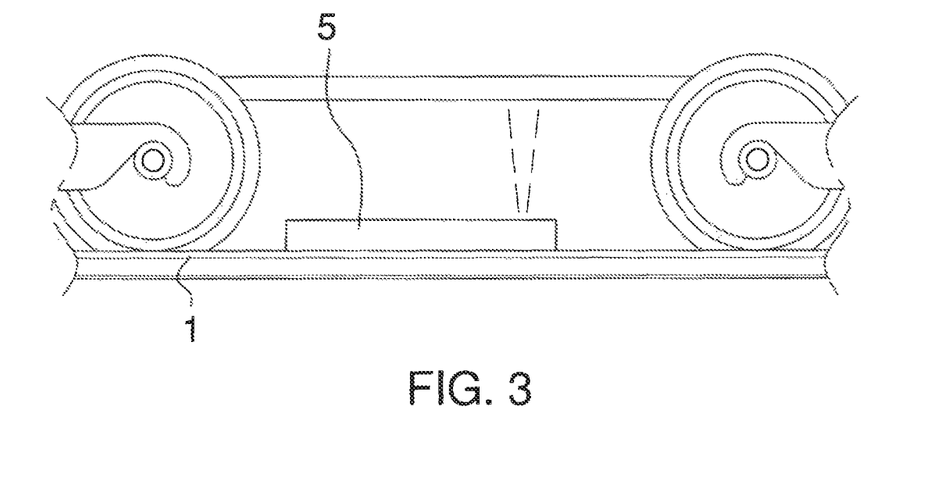
FIG. 3 is a representation of the container as a train rolls over the container.
Figure 4:
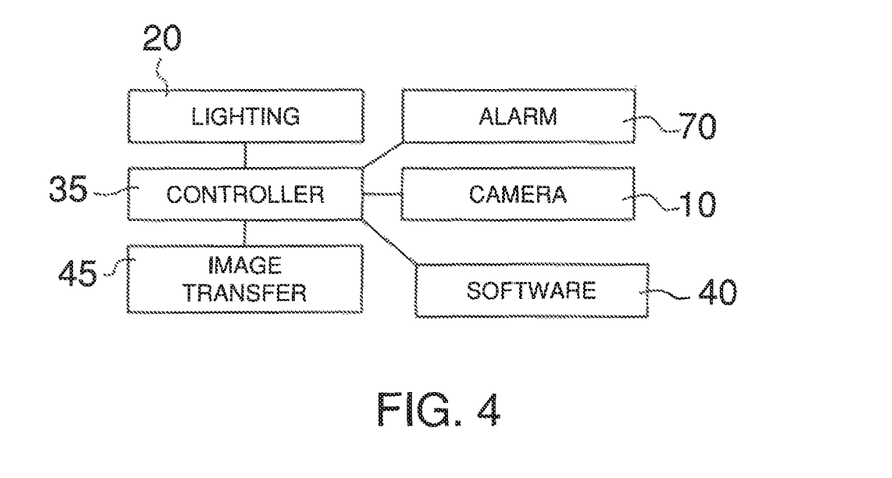
FIG. 4 is a schematic of the components of the components in the container.
Figure 5:
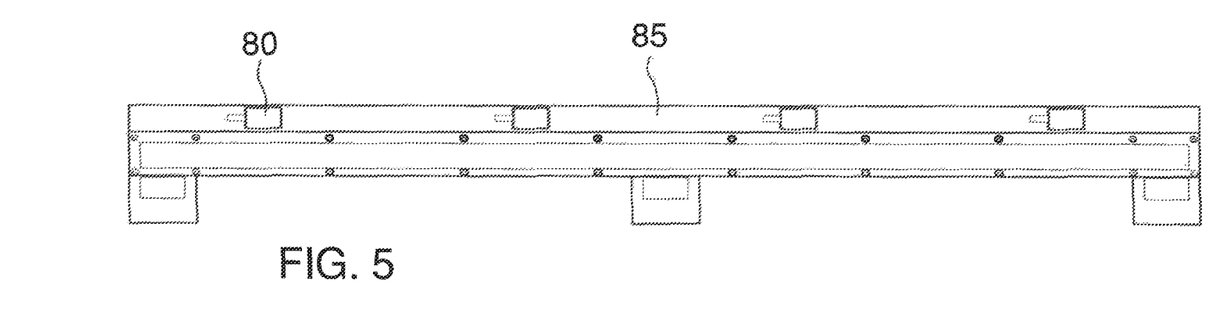
FIG. 5 is a front view of the linear speed detection device depicting the rail and the sensor.
Figure 6:
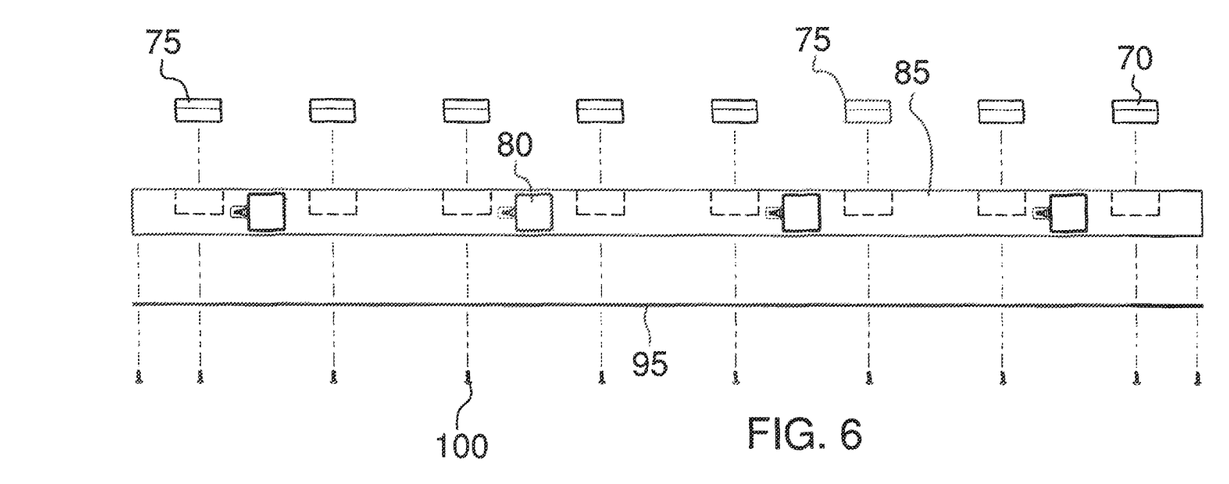
FIG. 6 is a top exploded view of the linear speed detection device.
Figure 7:
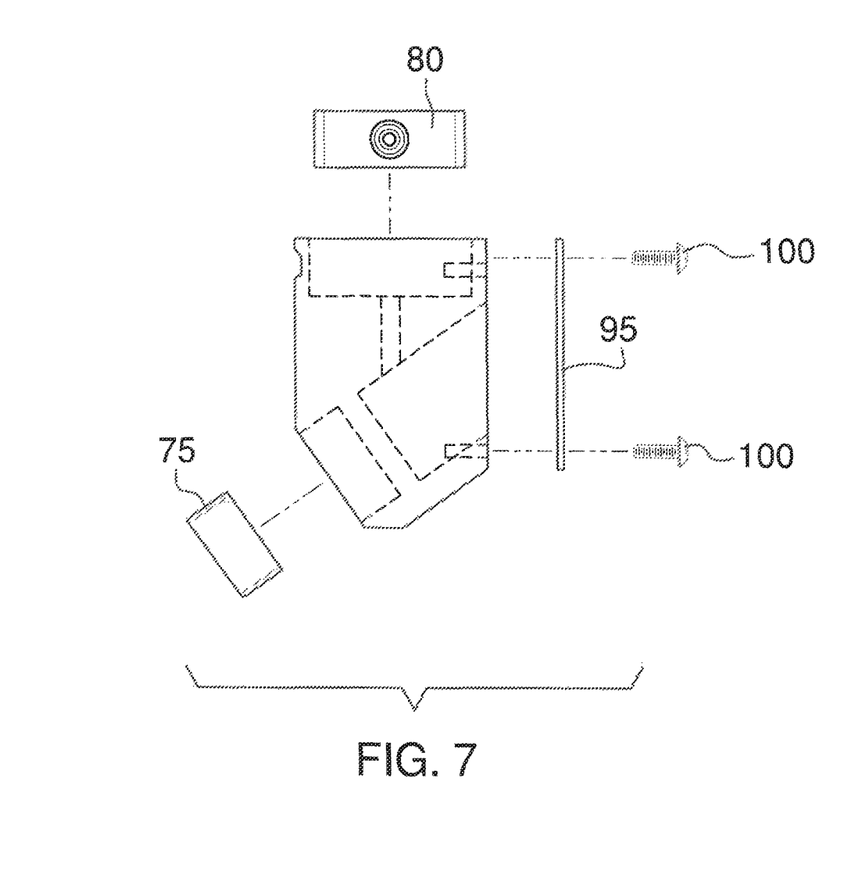
FIG. 7 is an exploded view of the sensor component.

Within the container 5 that is either buried or placed between the railroad tracks 1 such as depicted in FIG. 1 are the following components: camera 10, mirror 15, lighting means 20, a slit 30, which is in the range of 1-5 pixels wide and is provided so that the images of the undercarriage of a train car can be gathered and controller 35 for the container components. The camera images will be collected through the slit as the image of the undercarriage is reflected off the mirror 15 that is in the container 5. In order to insure a clear image, a piece of anti-glare glass 25 is placed over the slit 30 and the lighting around the area is carefully monitored and controlled.

The camera 10 is capable of capturing high resolution images at rapid speeds in a variety of lighting or environmental conditions to include low lighting, dim lighting, and complete darkness. Additionally the speed of the camera frame speed is controlled and adjusted in real time by the software from data that is collected from the linear speed detection device 60 and the controller for the speed detection device 115 for the speed detection device 110 that collects the speed data and then adjusts the frame speed of the camera 10.

The mirror 15 is provided to ensure that the image of the undercarriage of the train car is clearly represented and to prevent damage to the camera within the container 5. As the trains roll over the container 5, a series of fragmented images are taken of the undercarriage of the train. These images are in the range of 1-5 pixels, with a preferential pixel width of 2 pixels. Each of the images are collected individually and sent to a server. The individual images that are captured are then reassembled to present a clear picture of the train undercarriage.

At a certain preset, probably the length of a train car, in the software control the set points at which images are reassembled into a picture of the individual train car. The individual train cars can then be reassembled by the software into a complete train and the images transferred 45. The software 40 is likely to have a preset at the individual train car so that the pixels can be reassembled into an individual train car and the view of the entire train once reassembled by the software can then be transferred to a remote location and then reassembled and viewed. The software will allow the images of the entire train to be forwarded to a remote location, if needed.

The lighting means 20 can be adjusted both in terms of intensity and direction to obtain the best possible images as the area above the slit 30 is illuminated. The lighting means is necessary to insure an appropriate discernible image can be captured and reproduced. The lighting means 20 is illuminated in such a way that it minimizes the likelihood of shadows covering the inspected areas of the trains undercarriage. Many different types of lighting means may be used but considerations for the lighting means should include the ability to quickly and brightly illuminate the area. The choice of LED lighting is probably an ideal means to illuminate although different means may be used.

Software 40 is provided to control the activation and deactivation of the system, the lighting means including the intensity and direction of the lighting means as well as the image capture and image transfer 45. After the fragmented pictures of the undercarriage of a train car are gathered, the images are reassembled to provide a high resolution image. End points are established by the software to gather a finite amount of information.

The software also provides an alarm (not depicted) in the event that a preset anomaly is detected, such as a foreign object in the undercarriage of the train car or damage to any of the components of the undercarriage including the coupling or knuckle of the train car.

While the description of this invention is set forth in this application, modifications may be made to the invention without departing from the spirit of the invention.

The inventors claim:

1. An apparatus to capture continuous high resolution images of a moving train undercarriage that is comprised of:
   a. a container;
   wherein the container is a predetermined configuration;
   wherein the container houses components;
   said components include a camera, a mirror, illumination means, anti-glare glass and a controller;
   b. a linear speed detection device;
   wherein the linear speed detection device measures the speed of the train;
   wherein the linear speed detection device is further comprised of a plurality of sensors;
   wherein the plurality of the sensors will calculate the speed of a train;
   wherein the plurality of sensors are secured to a bar;
   wherein a plurality of bars are used;
   said plurality of bars are secured to a railroad track;
   wherein each individual sensor is encased in a protective casing;
   c. a controller for the speed detection device;
   wherein the controller for the speed detection device gathers the input from the speed sensor device;
   d. a camera;
   wherein the camera is linked to the controller for the speed sensor device;
   wherein the camera is capable of taking high resolution images;
   wherein the camera will operate in a variety of lighting conditions;
   wherein the frame rate of the camera can be modified;
   e. a mirror;
   wherein a mirror is provided to permit the gathering of the high resolution images;
   wherein the mirror is positioned to permit the camera to take an image through a slit;
   wherein the slit permits the capture of an image;
   f. lighting means;
   wherein the lighting means is provided in the container;
   wherein said lighting means is adjustable;
   wherein the direction of said lighting means can be changed;
   wherein the intensity of the lighting means can be changed;
   g. software;
   wherein the software controls the activation and deactivation of a system that includes
   software to control the speed at which the camera captures images;
   software to control the direction of the lighting;
   software to control the intensity of the lighting;
   software to control the frame rate of the camera;
   h. a controller for the container components;
   wherein the controller operates the components in the container;
   i. an alarm;
   wherein the alarm alerts personnel at a remote location using presets in the software;
   j. anti-glare glass;
   wherein the anti-glare glass helps to prevent light from entering the interior of the container;
   wherein said anti-glare glass helps to prevent light from diminishing the quality of images captured by the camera.

2. The device as described in claim 1 wherein the camera is capable of capturing images in dim lighting.

3. The device as described in claim 1 wherein the camera is capable of capturing images in low lighting conditions.

4. The device as described in claim 1 wherein the camera is capturing images in darkness.

5. The device as described in claim 1 wherein the software captures a predetermined amount of images at a preset point.

6. The device as described in claim 1 wherein the slit is between 1-5 pixels in width.

7. The device as described in claim 1 wherein the system is activated using presets in the software.

8. The device as described in claim 1 wherein the placement of the sensor is placed on the exterior of the railroad track.

9. The device as described in claim 1 wherein the speed of the train is calculated within a fraction of a mile per hour.

10. The device as described in claim 1 wherein the sensors are inductive sensors.

11. The device as described in claim 1 wherein the system is deactivated using presets in the software.

12. The device as described in claim 1 wherein the placement of the sensor is placed on the interior of the railroad track.

13. A method to capture continuous high resolution images of an undercarriage of a train that is comprised of:
    a. Determining the real time variable linear speed of the train with a plurality of linear speed devices;
    b. a means of activation of a set of components of a system;
    wherein the means of activation is controlled by software;
    wherein the means of activation is controlled using predetermined presets;
    wherein the means of activation is turned off using predetermined presets;
    c. Reporting the real time speed from the linear speed device to a controller;
    d. Reporting the real time speed from the controller to a high resolution line scan camera;
    e. Using the reported real time speed of the train to capture a plurality of high definition images of the train's undercarriage;
    wherein the software captures multiple image perspectives of the undercarriage of the train;
    f. Reporting the series of multiple image perspectives high definition images to the controller;
    wherein the multiple image perspectives are reassembled to form a composite image of a portion of a railcar;

g. Reporting the series of high definition images from the Software to a remote location for viewing.

* * * * *